United States Patent
Cravey et al.

(10) Patent No.: US 7,390,984 B2
(45) Date of Patent: Jun. 24, 2008

(54) HIGH POWER LIQUID DIELECTRIC SWITCH

(75) Inventors: William Ray Cravey, Albuquerque, NM (US); Randy D. Curry, Columbia, MO (US); Kenneth Fox McDonald, Columbia, MI (US); Glenn A. Anderson, St. Charles, MO (US); Richard Sears, Livermore, CA (US)

(73) Assignees: Alpha-Omega Power Technologies Ltd. Co., Albuquerque, NM (US); The Curators of the University of Missouri, Columbia, MO (US); The Boeing Company, St. Louis, MO (US)

( * ) Notice: Subject to any disclaimer, the term of this patent is extended or adjusted under 35 U.S.C. 154(b) by 185 days.

(21) Appl. No.: 11/452,560

(22) Filed: Jun. 13, 2006

(65) Prior Publication Data

US 2007/0197051 A1    Aug. 23, 2007

Related U.S. Application Data

(63) Continuation-in-part of application No. 10/870,381, filed on Jun. 17, 2004, now Pat. No. 7,312,412.

(60) Provisional application No. 60/690,223, filed on Jun. 13, 2005, provisional application No. 60/479,405, filed on Jun. 17, 2003.

(51) Int. Cl.
*H01H 35/24* (2006.01)
*H01H 33/00* (2006.01)
*H02B 1/24* (2006.01)

(52) U.S. Cl. .................. 200/81 R; 218/19; 307/112

(58) Field of Classification Search .................. None
See application file for complete search history.

(56) References Cited

U.S. PATENT DOCUMENTS

| 4,755,719 A | * | 7/1988 | Limpaecher | ............... 313/597 |
| 4,931,687 A | * | 6/1990 | Thayer | ............. 313/231.01 |
| 5,235,905 A | | 8/1993 | Bushnell et al. | |

OTHER PUBLICATIONS

Curry, Randy D. et al., "The Development and Testing of Subnanosecond-Rise, Kilohertz Oil Switches for the Generation of High-Frequency Impulses", *IEEE Transactions on Plasma Science*, vol. 20 No. 3 Jun. 1992, 383-392.
Kattan, R. et al., "Formation of Vapor Bubbles in Non-polar Liquids Initiated by Current Pulses", *IEEE Transactions on Electrical Insulation*. vol. 26, No. 4 Aug. 1991, 656-662.
Koo, K. C. et al., "The Effects of Hydrostatic Pressure, Temperature, and Voltage Duration on the Electric Strengths of Hydrocarbon Liquids [Abstract Only]", *Journal of the Electrochemical Society* vol. 108, Issue 6 Jun. 1961, 522-528.

* cited by examiner

*Primary Examiner*—Scott B. Geyer
*Assistant Examiner*—Seahvosh J Nikmanesh
(74) *Attorney, Agent, or Firm*—Philip D. Askenazy; Deborah A. Peacock; Peacock Myers, P.C.

(57) ABSTRACT

Method and apparatus for switching high power at high repetition rates. The apparatus is preferably a switch utilizing a pressurized flowing dielectric. The pressurized dielectric suppresses growth of dielectric breakdown byproducts, such as large bubbles and breakdown contamination, enabling lower dielectric flow rates to remove the byproducts. In addition to the advantage of lower flow rates, and thus smaller and lighter pumping means, the switch can switch high energies (up to megajoules) at fast repetition rates, up to thousands of pulses per second. The switch is preferably triggered to reduce jitter. The switch can also be used to remove water from oil.

20 Claims, 9 Drawing Sheets

HIGH POWER LIQUID DIELECTRIC SWITCH

CROSS-REFERENCE TO RELATED APPLICATIONS

This application claims the benefit of the filing of U.S. Provisional Patent Application Ser. No. 60/690,223, entitled "High Power Liquid Dielectric Switch," filed on Jun. 13, 2005. This application is also a continuation-in-part application of U.S. patent application Ser. No. 10/870,381 now U.S. Pat. No. 7,312,412, entitled "High Power Liquid Dielectric Switch", filed on Jun. 17, 2004, which claims the benefit of the filing of U.S. Provisional Patent Application Ser. No. 60/479,405, entitled "Development of High Power, High Pressure, Rep-Rate, Liquid Dielectric Switches," filed on Jun. 17, 2003. The specification and claims of all of these references are incorporated herein by reference.

GOVERNMENT RIGHTS

The U.S. Government has a paid-up license in this invention and the right in limited circumstances to require the patent owner to license others on reasonable terms as provided for by the terms of United States Air Force, Air Force Research Lab under Contract No. USAF F33615-01-C-2191.

BACKGROUND OF THE INVENTION

1. Field of the Invention (Technical Field)

The present invention relates to a high power electric switch which has an ultra short rise time and can be fired at a repetition rate from less than a pulse per second to more than 20,000 pulses per second and can switch joules to megajoules of energy per pulse with switch rise times of less than a nanosecond, yet switch pulse widths ranging from picoseconds to milliseconds.

2. Background Art

Note that the following discussion is given for more complete background of the scientific principles and is not to be construed as an admission that such concepts are prior art for patentability determination purposes.

Large scale pulse power systems, such as accelerators, fusion accelerators, medical accelerators, high power microwave systems, and other high voltage or pulse power systems require the switching of very high power (megawatt) loads, for example from one Joule to megajoules per pulse, and high repetition rates, for example from less than one pulse per second to 20,000 pulses per second. Early studies at moderate pressures have shown breakdown strength in liquids to be a function of pressure up to at least 350 psi (see K. C. Kao and J. B. Higham, "The effects of hydrostatic pressure, temperature, and voltage duration on the electric strengths of hydrocarbon liquids," J. Electrochem. Soc., vol. 108, no. 6, pp. 522-528, June 1961). Pressurized flowing dielectric switches which can switch several hundred kilovolts are known in the art. However, such switches which operate at or near atmospheric pressure require substantial dielectric flow rates of 10-1000 liters per second (l/sec) when they are used to switch multikilojoule pulses. In 1992, subnanosecond rise time, kilohertz rep-rate oil switches were built and demonstrated that could operate at up to 290 kV at 200 pps and at 170 kV with a rep-rate of 1000 pps. The demonstrated rise time into a 97 Ω resistive load was 280 ps. The modulator system, which utilized near atmospheric medium pressure oil switches, transferred a peak energy of 50 J per pulse (R. Curry et al., "The Development and Testing of Subnanosecond-Rise, Kilohertz Oil Switches for The Generation of High-Frequency Impulses", *IEEE Transactions on Plasma Science*, Vol. 20, No. 3, June 1992, pp. 383-392, incorporated herein by reference) and demonstrated significant improvement in the breakdown jitter of liquid switches. These oil switches utilized transformer oil at pressures ranging from 1 atmosphere up to 100 psig. The flow rate geometries used in the switches included cross flow, or axial flow in switches that had a near uniform and enhanced electrode geometry. However, these switches were unable to switch kilojoules of energy for they were limited by residual bubbles at a flow rate of 1.6-7.57 l/sec at a repetition rate of over 100 pulses per second (pps).

Single-shot work on high pressure liquid switches examined the effects of pressure upon breakdown voltage (see J. Leckbee, R. Curry, K. McDonald, R. Cravey, and A. Grimmis, "An advanced model of a high pressure liquid dielectric switch for directed energy applications," in Proc. IEEE 14$^{th}$ Int'l. Pulse Power Conf., 2003, pp. 1389-1393, and J. Leckbee, R. Curry, K. McDonald, P. Norgard, R. Cravey, G. Anderson and S. Heidger, "Design and testing of a high pressure, rep-rate, liquid dielectric switch for directed energy applications," in Proc. IEEE 26$^{th}$ Int'l. Power Modulator Conf., 2004, pp. 193-196

When a high voltage pulse is applied to a flowing dielectric switch, once the switch breakdown voltage is reached, a streamer is launched and subsequent avalanche ionization and breakdown of the dielectric results. The arc then ionizes the dielectric medium and a gas bubble is formed between the electrodes. As the hydraulic or hydrostatic pressure is increased, the bubble size decreases. It is known that above a critical pressure for certain liquids, no bubbles are formed by charge injection (R. Kattan et al., "Formation of Vapor Bubbles in Non-polar Liquids Initiated by Current Pulses", *IEEE Transactions on Electrical Insulation* Vol. 26, No. 4, August 1991, pp 656-662, incorporated herein by reference). However, below a given operating or critical pressure the diameter of the bubble expands well beyond the electrode separation distance. The gas bubble grows and subsequently collapses, oscillating, until it finally rapidly degenerates into both suspended micro-bubbles and discharge byproducts (principally hydrocarbons) that encompass a large volume, if not the entirety, of the switch housing and electrode region.

Liquid dielectric insulated switches cannot sustain high voltages when gas bubbles, dissolved gases, and hydrocarbon byproducts are present because arcing or pre-firing is uncontrollably self-initiated. This also prevents recovery of the switch if voltage were reapplied before the entire volume of liquid in the switch could be exchanged, thus reducing the required achievable repetition rate because of the enormous liquid flow rates that would otherwise be required. Consequently, the repetition rate attainable by present day low-pressure liquid dielectric switches which transfer 100 J-1 MJ is typically limited to much less than one pulse per second, thereby eliminating them from addressing the high average power requirements of many crucial applications. This phenomenon occurs in all known liquid dielectric media suitable for pulse power switching applications, including water, water-glycol solutions, transformer oil, polyalphaolefin (PAO), and other synthetic dielectrics.

Thus there is a need for a kilovolt to megavolt capable, multijoule to megajoule range high power switch with high repetition rate operation, minimized dielectric media flow volume requirements with maximized local flow velocity in the vicinity of the electrodes; minimized electrode erosion; and reduced byproduct formation. There is also need for a compact switch with reduced acoustic impulse and a reduced EMI signature, and with enhanced reliability due to the inhibition of the access and/or adherence of the discharge byproducts to the switch housing solid insulators. The ability of the switch to utilize fluids such as PAO or other synthetic or natural dielectrics that are compatible with existing airframe and aerospace systems is a major advantage, allowing the switch to be integrated with an existing airframe hydraulic system, thereby reducing the volume of support equipment required for directed energy systems.

SUMMARY OF THE INVENTION (DISCLOSURE OF THE INVENTION)

The present invention is an electric switch comprising at least two electrodes and a flowing liquid dielectric having a pressure greater than approximately 100 psig, wherein the switch is capable of switching greater than approximately 1 joule, or preferably greater than approximately 50 joules, or more preferably greater than approximately one kilojoule, or most preferably greater than approximately one megajoule. The switch is preferably capable of switching greater than approximately five kilovolts, or more preferably greater than approximately 50 kilovolts, or yet more preferably greater than approximately one megavolt, or most preferably greater than approximately 5 megavolts. The switch preferably has a repetition rate of greater than approximately one pulse per second (pps), or more preferably greater than approximately 10 pps, or even more preferably greater than approximately 100 pps, or yet more preferably greater than approximately 1000 pps, or most preferably greater than approximately 10,000 pps. The dielectric preferably has a flow rate of less than approximately 100 liters per second, or more preferably less than approximately 20 liters per second, or even more preferably less than approximately 2 liters per second, or most preferably less than approximately 0.2 liters per second.

The dielectric is preferably de-aerated and preferably comprises a synthetic lubricant, optionally hydraulic fluid. The dielectric most preferably comprises polyalphaolefin (PAO). The distance between the at least two electrodes is preferably variable. Each electrode preferably has at least one opening which enables the dielectric to flow between an interior and exterior of each electrode. The dielectric preferably enters the switch cavity through the opening in a first electrode and exits the switch cavity through the opening in a second electrode. Each electrode is optionally substantially hemispherical. Alternatively, a first electrode is partially surrounded by a second electrode. The switch optionally comprises at least one cylindrical flow channel, which preferably provides a flow of the dielectric around the first electrode. The switch preferably comprises an outer coaxial return and a dielectric flow system. The dielectric flow system is optionally integrated with the switch, or alternatively comprises an airframe hydraulic system, or alternatively comprises a stand alone pump cart or system.

The invention is also a method for switching comprising the steps of providing at least two electrodes, pressurizing a liquid dielectric to a pressure greater than about 100 psig, flowing the liquid dielectric between the electrodes, inducing a voltage drop between the electrodes of at least a breakdown voltage of the dielectric, breaking down the dielectric between the electrodes, thereby providing an electrical path between the electrodes; and switching greater than approximately 1 joule. The breaking down step is preferably performed at a rate of at least approximately one pps, or more preferably at least approximately 10 pps, or even more preferably at least approximately 100 pps, or yet more preferably at least approximately 1000 pps, or most preferably at least approximately 10,000 pps. The dielectric flows at a rate of preferably less than approximately 100 liters per second, or more preferably less than approximately 20 liters per second, or even more preferably less than approximately 2 liters per second, or most preferably less than approximately 0.2 liters per second. The present method is for switching preferably greater than approximately 50 joules, or more preferably greater than approximately one kilojoule, or most preferably greater than approximately one megajoule. The method is also for switching preferably greater than approximately five kilovolts, or more preferably greater than approximately 50 kilovolts, or even more preferably greater than approximately one megavolt, or most preferably greater than approximately 5 megavolts.

The method preferably further comprises the step of de-aerating the dielectric, and preferably further comprises the step of varying a distance between the electrodes. The dielectric preferably flows out of a first opening in a first electrode and into a second opening in a second electrode. The method preferably further comprises the step of partially surrounding the first electrode with the second electrode, wherein the dielectric is preferably flowed around the first electrode. The method further preferably comprises the step of removing breakdown contamination, optionally comprising bubbles, from between the electrodes. The method further preferably comprises the step of lowering an inductance of a switch comprising the electrodes and the dielectric, preferably by partially surrounding the switch with an outer coaxial return.

The invention is also an electric switch comprising at least two electrodes, a flowing liquid dielectric having a pressure greater than approximately 100 psig; and a trigger for operating the switch. The trigger preferably comprises an element selected from the group consisting of a trigatron, a laser pulse, a microwave pulse, and series injection. The trigatron is preferably disposed substantially between the electrodes. The trigger is alternatively operated by adjusting a pressure of the dielectric. The switch optionally further comprises at least one additive in the dielectric for reducing the dielectric strength of the dielectric. The switch preferably further comprises an element for controlling flow of said dielectric. The element is preferably cylindrically disposed around one of the electrodes. The switch is preferably capable of switching greater than approximately 1 joule.

The invention is further a method for switching comprising the steps of providing at least two electrodes, pressurizing a liquid dielectric to a pressure greater than about 100 psig, flowing the liquid dielectric between the electrodes; and triggering a dielectric breakdown between the electrodes, thereby providing an electrical path between the electrodes. The method preferably further comprises the step of switching greater than approximately 1 joule. The triggering step is preferably performed at a desired voltage or desired time and optionally comprises operating a trigatron. The triggering step optionally comprises raising a pressure of the dielectric, thereby increasing a gap between the electrodes to a first gap value, providing a voltage difference between the electrodes, and lowering the pressure of the switch, thereby decreasing the gap between the electrodes to a second gap value. The voltage difference is preferably not large enough to cause dielectric breakdown at the first gap value but is preferably large enough to cause dielectric breakdown at the second gap value. The method preferably further comprises the step of controlling a flow of the dielectric, preferably comprising employing a flow shaping element.

The invention is also a method for reducing water content in a dielectric, the method comprising the steps of providing at least two electrodes, pressurizing a liquid dielectric containing water to a pressure greater than about 100 psig, flowing the liquid dielectric between the electrodes, and triggering a dielectric breakdown between the electrodes, thereby removing at least some of the water from the dielectric. The dielectric preferably comprises a fluid selected from the group consisting of a synthetic lubricant, hydraulic fluid, and polyalphaolefin (PAO).

The invention is yet further a switch comprising at least two electrodes, a flowing liquid dielectric having a pressure greater than approximately 100 psig, and a flow shaping element for controlling the flow of the liquid dielectric. The switch alternatively comprises at least two electrodes, a flowing liquid dielectric having a pressure greater than approximately 100 psig, and a dielectric additive for reducing the dielectric strength of the dielectric.

An object of the present invention is to provide a high power switch capable of achieving high repetition rates.

Another object of the invention is to provide a high pressure oil switching technology that results in low switching jitter and long electrode lifetime.

An advantage of the switch of the present invention is its lower dielectric flow rate, which permits the use of a small, lightweight flow recirculating system, and increases the achievable repetition rate.

A further advantage is the compatibility of the present switch with existing hydraulic fluids and airframe hydraulic systems, thus optionally eliminating the need for a separate dielectric flow system.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
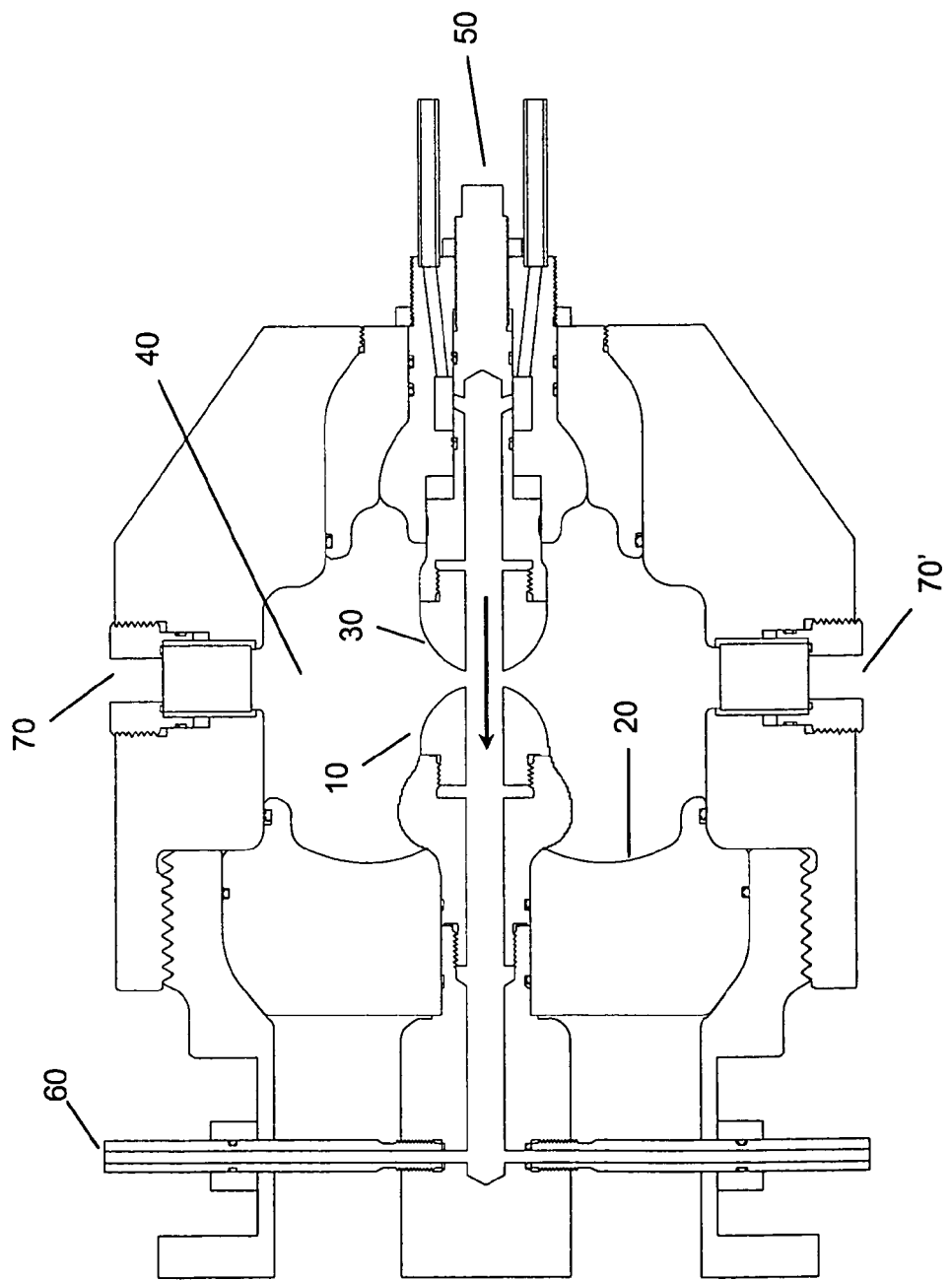
FIG. 1 is a cutaway view of an inline switch of the present invention.

DESCRIPTION OF THE PREFERRED EMBODIMENTS (Best Modes For Carring Out The Invention The present invention is a liquid dielectric switch able to switch from hundreds of kilovolts to megavolts and thousands of kiloamperes, with discharge times ranging from a picosecond to a few milliseconds or less, operated at pressures ranging from 1 psig to 8000 psig.

As used throughout the specification and claims, "breakdown contamination" means discharge, carbon, hydrocarbon and/or electrode byproducts, byproducts, debris, debris cloud, bubbles, micro-bubbles, and the like.

The switch preferably uses liquid dielectric pressures on the order of about 10 psig, and more preferably about 50 psig, and more preferably about 100 psig, and most preferably about 1000 psig or more, thereby either preventing gas bubble formation or dramatically reducing bubble size, which enables rapid reabsorption of the bubbles by the fluid. Although a bubble of significant size is not generated at high enough pressures, a debris cloud containing discharge byproducts (principally carbon and electrode byproducts) expands from the discharge site and, if not removed, eventually fills a significant portion of the switch volume. However, pressurization minimizes this issue, reducing the volume of contaminated dielectric fluid, allowing the byproducts to be rapidly swept out of the inter-electrode gap with a minimum of flow and replacing them with fresh, uncontaminated flowing insulating dielectric material. That is, the velocity of the dielectric media flow in the vicinity of the electrodes easily exceeds the expansion velocity of the debris cloud, thus sweeping the debris away from the electrodes and into a field-free region prior to the next charge cycle. The combination of elimination of the large gas bubble expansion, reabsorption of the micro-bubbles, and a smaller debris cloud means a dramatically lower flow rate may be used. This enables a switch to recover in less time when operated above a threshold pressure, thus enabling higher repetition rates and higher power operation. In addition, use of the present invention is advantageous over the existing art even in low power and/or low repetition rate applications. This is because of the much lower dielectric flow rate required to sweep bubbles and debris out from between the electrodes. Not only is this easier to implement, but also it enables the use of smaller, lower power, and lower weight pumps, which is especially advantageous for aerospace applications.

Operation of the switch of the present invention at high pressures preferably results in undersaturation of the flowing dielectric, providing an advantage over other switches known in the art. For de-aerated, pressurized liquid dielectrics, the gas desorbed by the arc breaks up into microbubbles and then is partially reabsorbed into the liquid dielectric on a millisecond time scale. The amount of gas desorbed is also significantly less in undersaturated solutions, facilitating much quicker voltage recovery of the switch. In contrast, for prior art switches which operate at or near atmospheric pressure, the liquid dielectrics are normally saturated with gas, which greatly lengthens the reabsorption time of the desorbed gas, and thus the recovery time of the switch, thereby lowering the achievable repetition rate.

Several electrode geometries, including but not limited to axial electrodes or radial electrodes, may be employed to optimize the flow, discharge, and electrode erosion properties of the switch. One preferred embodiment, an inline switch with radial insulator, is depicted in FIG. 1. A high voltage pulse is applied to input electrode 10, which is preferably supported by high voltage insulator 20, which is preferably designed to operate at high voltage and high pressures simultaneously. An electric field is generated between the input electrode 10 and output electrode 30. Electrodes 10, 30 are preferably substantially hemispherical. Switch cavity 40 is filled with liquid dielectric at a pressure significantly higher than atmospheric pressure, preferably between about 1000 and 2000 psig. The electric field causes the liquid dielectric between input electrode 10 and output electrode 30 to break down, enabling current to flow between the electrodes, thereby closing the switch. The current flow and resulting plasma causes the high pressure dielectric to form debris comprising carbon and other byproducts between the electrodes. Flowing dielectric enters the switch through inlet 50, preferably flows through hollow electrodes 10, 30 in the direction indicated by the arrow, and exits the switch via outlet 60. The dielectric preferably flows through a recirculating system (not pictured), more fully described below. This flow sweeps the debris out from the center of the electrodes. The breakdown voltage of the switch is determined by the electrode spacing, which is preferably adjusted by moving output electrode 30. Output electrode 30 preferably comprises a threaded assembly to facilitate this adjustment. Sight ports 70, 70' are preferably used to view and/or record the breakdown process and clearing time of the debris.

Figure 2:
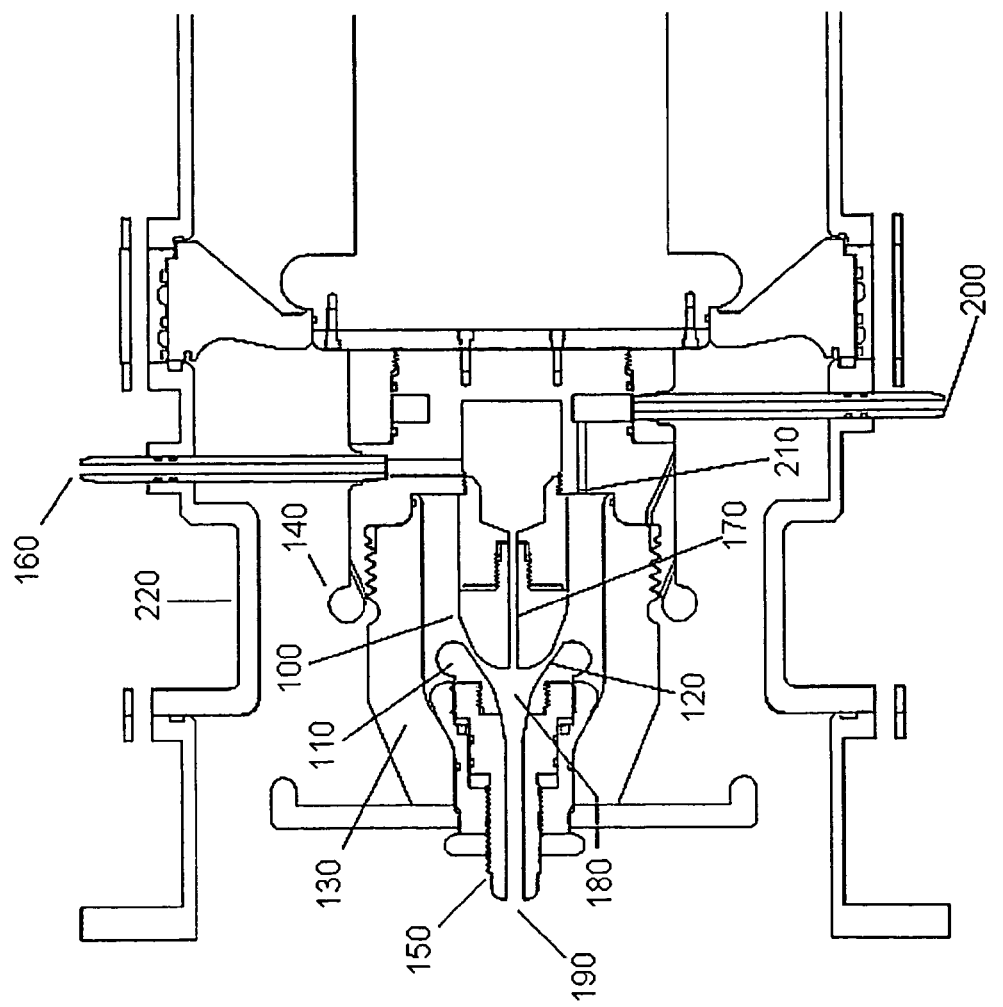
FIG. 2 is a cutaway view of a coaxial switch of the present invention.

FIG. 2 depicts a switch of the present invention having coaxial switch geometry. High voltage is applied to input electrode 100, which are preferably designed to be replaceable. Output electrode 110 is isolated from input electrode 100 by the high pressure liquid dielectric in breakdown region 120, which is preferably contained by annular high pressure insulator 130. One or more field shapers 140 are preferably used to control the electric field distribution across insulator 130. Gap adjuster 150 is preferably threaded and is preferably used to adjust the gap spacing between input electrode 100 and output electrode 110. Micro-bubbles and breakdown contaminants in the liquid dielectric formed by the conducting plasma, which occurs during breakdown of the dielectric, are swept out of breakdown region 120 by the flowing dielectric.

Multiple dielectric flow paths may be utilized. Axial flow dielectric preferably enters the switch through axial flow inlet 160 and enters cavity 180 through input electrode channel 170. Cylindrical flow dielectric optionally enters the switch through cylindrical flow inlet 200 and enters cavity 180 through cylindrical flow channel 210. A plurality, preferably twelve, of cylindrical flow inlets 200 and cylindrical flow channels 210, preferably circumferentially arranged around the switch, and preferably evenly spaced, may be employed. The cylindrically flowing dielectric facilitates the removal from breakdown region 120 of the carbon and other breakdown byproducts. Dielectric from cavity 180 exits the switch through output electrode 110 via dielectric outlet 190. The axial flow topology may optionally operate in a "jet pump" mode, whereby the axial flow dielectric from entering cavity 180 from channel 170 has a high enough flow rate so that the dielectric media surrounding the electrodes, optionally partly comprising dielectric entering cavity 180 from cylindrical flow channels 210, is "pulled" radially into gap cavity 180 and exits axially through outlet 190. In the jet pump mode the flow may be provided by the main dielectric pumping system or alternatively by a separate, smaller system used solely for pumping the axial flow dielectric.

Fast switching times are accomplished preferably by utilizing outer coaxial return 220, which is substantially cylindrically disposed about the switch, thereby reducing the overall inductance of the switch. Outer coaxial return 220 is preferably connected via an electric load to the output electrode assembly.

As depicted in the above embodiments, the liquid dielectric media flow may enter the gap between the electrodes either radially or axially, or by a combination thereof, but preferably exits the gap axially in order to transport the discharge the byproduct debris cloud into the interior of the electrode, which is the nearest electric field-free region, prior to application of the next voltage pulse. The electrodes may be hollow or may optionally consist of machined electrodes that allow on axis flow and subsequent removal of the byproducts. Porous electrode surfaces may optionally be used to prevent boundary layers from forming.

In all embodiments of the present invention, the voltage breakdown of the system is preferably monitored in real time. In order to compensate for electrode erosion, the gap spacing of the electrodes is preferably adjusted to increase or decrease the breakdown voltage until the desired value is reached. The adjustment system preferably comprises a mechanical or electrical system, preferably comprising piezoelectric actuators, and optionally comprising a feedback system. The adjustment can alternatively be made manually. The electrodes preferably comprise a metal or other conducting material with low erosion rates, including but not limited to stainless steel, tungsten composites, tungsten-copper matrices, single crystal tungsten, and other synthetic materials that have a low erosion rate. Directed flow electrodes that allow the flow to be reduced and direct the byproducts into a field free region may alternatively be employed.

The flowing dielectric used in the high pressure switch of the present invention may comprise transformer oil, water, water-glycol mixtures, synthetic oils such as hydraulic fluid, or any other dielectric with desirable insulation characteristics which can be pressurized. Some transformer oils, which have been traditionally used for high voltage switches, are not compatible with high pressure, flowing pumping systems. Water and other natural or synthetic dielectrics also may freeze and require external heaters or separate pumping systems as well as additives such as antifreeze. The preferable use of synthetic lubricants in the present switch further enhances its capabilities because of these lubricants' greater voltage hold-off capability and reduced formation of byproducts. The tested performance of the synthetic fluids also increase the electric breakdown field of the switch allowing the electrode spacing to be reduced and lowering the inductance of the switch, the switch losses and the flow rate due to the reduced volume of liquid between the electrodes.

A preferred synthetic oil is polyalphaolefin (PAO), which has a higher flashpoint, is compatible with current airframe systems, and has a superior viscosity than that of transformer oil. The measured breakdown voltage, 1.1-1.25 MV/cm, of de-aerated PAO was found to be comparable or superior to that of transformer oils operated at pressures in the range of 1000-2000 psig. For various pulse charge times the breakdown field may be in the range of 200 kV/cm up to 10 MV/cm. The utilization of flowing dielectrics that are compatible with existing airframe and aerospace hydraulic systems (that is, fluids that are currently used as hydraulic fluid in airframe systems), including but not limited to PAO, is a novel aspect of the present invention. Such fluids have not been used as dielectrics in the past. The PAO solution both lubricates the hydraulic system and provides the dielectric strength required to hold off voltage and achieve the low inductance required by directed energy systems. In certain applications the switch may be directly integrated with the airframe hydraulic system, thus eliminating the need for a separate dielectric flow system, along with its attendant weight, complexity, and cost.

The switch or the present invention preferably utilizes electrode configurations which permit the control of the location of the discharge and the ability to move the discharge location to different areas on the electrode surface, thereby minimizing localized electrode erosion. These electrode configurations are also preferably optimized to minimize global dielectric media flow volume requirements while maximizing the flow velocity in the critical area of the electrodes, thereby rapidly sweeping the discharge byproducts into a field free region.

The switch also preferably comprises an integrated flow system and preferably utilizes a design prohibiting discharge byproducts from accessing and adhering to the switch housing solid insulators. The switch preferably is operated with a hydraulic recirculating dielectric media flow system, preferably comprising a pump for pressurization of the system and a reservoir. The pump may comprise an onboard hydraulic pump; alternatively an actuator may be used to pressurize the switch. The flow system preferably comprises one or more accumulators and particulate filters, which actively filter out carbon particle byproducts, including but not limited to micron sized particles, and allow continuous flow of the dielectric through the switch. The filters preferably include a particulate filter and/or a coalescing filter for removal of water and/or particles as desired. During normal operation of the switch, gases are introduced into the liquid dielectric by the arc and the subsequent arc byproducts. Therefore the liquid dielectric should preferably be de-aerated prior to and during operation of the switch. A de-aeration system, comprising one or more de-aeration stages, which consists of a vacuum pump and a reservoir is therefore preferably integrated into the pumping system. In one embodiment, the flow is preferably pulsed on and off to reduce the power required for the hydraulic system. This recirculating system may be integrated with the switch, or alternatively comprises either an existing on-board hydraulic system, such as that employed on an aircraft, or a stand alone pump cart or system.

Figure 16:
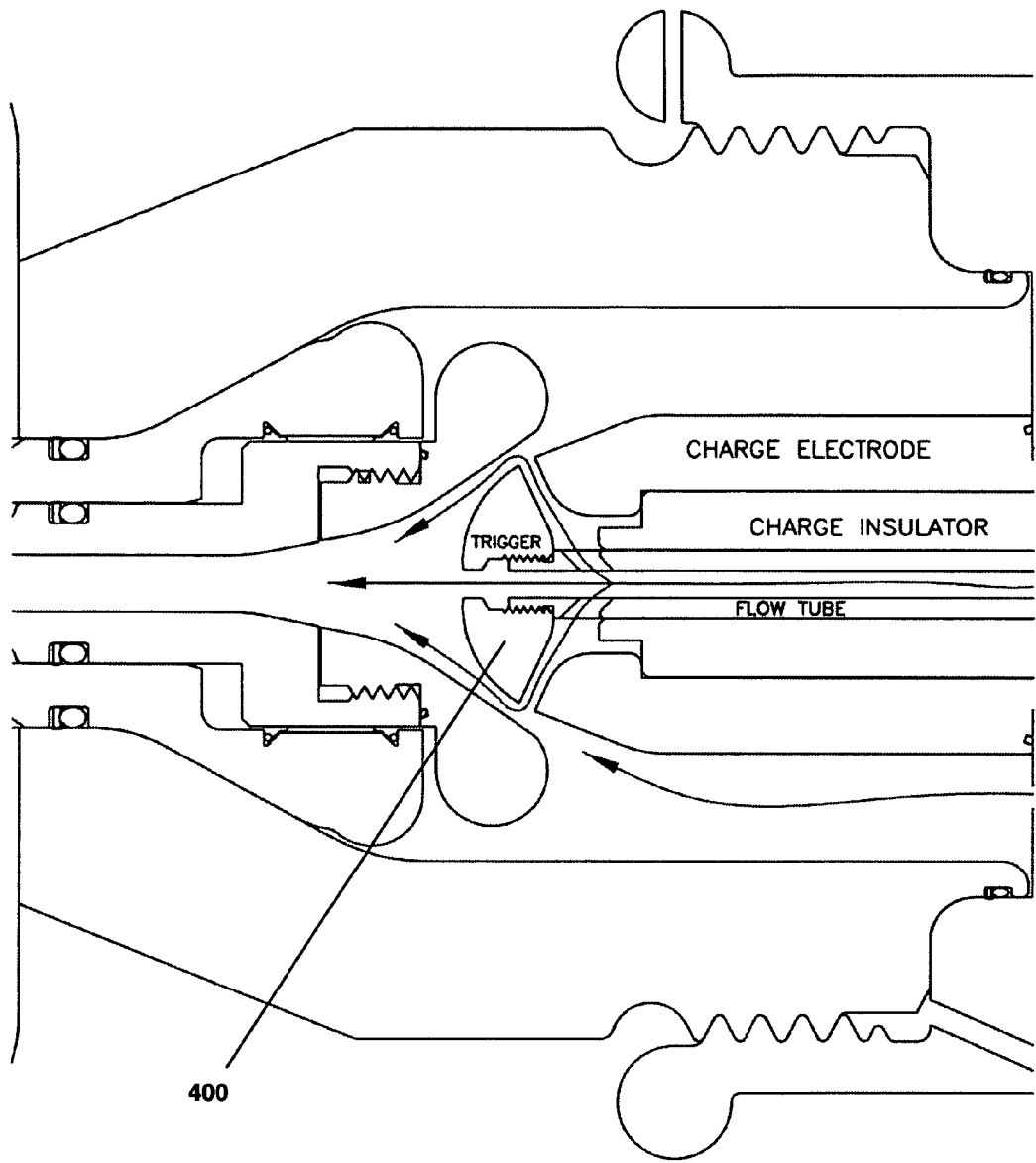
FIG. 16 depicts a trigatron-triggered switch of the present invention.

In pulsed power systems, or in other systems where low jitter is required, a triggered switch may be used, whereby a high voltage or trigger pulse is applied to the switch and the switch self-breaks upon command. The switch may be triggered by application of a high voltage trigger pulse, a laser pulse, a microwave pulse, series injection, or other means that introduces UV, electron avalanches or bubbles into the electrode gap and results in the switch breaking down, thereby triggering the switch with low jitter. If an electrical pulse is used to trigger the switch the switch may incorporate a midplane or a third electrode, as in a trigatron. FIG. 16 shows trigatron 400, which is placed so that there is a gap between it and both electrodes. The trigatron may be used on either the cathode or anode side of the switch, depending on the switch polarity. The high voltage electrical pulse starts streamers in the gap and introduces UV radiation and an electron avalanche which triggers the switch. In this embodiment the gas bubble introduced into the electrode gap provides a dielectric mismatch and an ionization path in the high electric field which exists in the gap between the electrodes. The initiation of the avalanche and subsequent ionization of the dielectric triggers the switch. The operation of an untriggered switch has high jitter, because without a trigger breakdown may occur at one value in one instance, for example 100 kV, but another value (for example 105 kV) during a different shot. Or, if the voltage is held constant, the time that the switch triggers will vary. By triggering the switch, the exact voltage or time can be chosen, thus reducing jitter.

A pressure-induced triggering scheme may also be used. Increasing or decreasing the pressure in the switch housing preferably causes an increase and/or decrease in electrode gap spacing. For example, increasing fluid pressure expands insulator 130, which expands output electrode 110 thereby increasing the gap between the electrodes. So one method may be to increase the pressure, charge up switch, and remove the pressure, at which point the electrodes get closer, and switch closes (breakdown occurs). This technique can be used to trigger the switch as well as adjust the breakdown voltage of the gap due to the variation in gap spacing.

It may also be desirable for oil additives to be added to reduce the dielectric strength of the liquid, enabling larger electrode gap spacing and increasing voltage hold-off. In general, examples of these additives include but are not limited to nanoparticles, solids, liquids, or any additive that can influence the breakdown behavior of the high pressure liquid dielectric.

EXAMPLE 1

A test stand comprising a switch of the present invention was constructed that has an output impedance of 4.4 Ω and produces a 70 ns pulse. The switch was designed for the following requirements: switched voltage: 250-1000 kV; current: 50-250 kA; risetime: <50 ns; charge transfer: ~0.5 Coulombs/pulse; switched energy: 250-1000 Joules per pulse; pressure: up to 3000 psig; jitter: <<50 ns; repetition rate: 50-150 pps; pulse width (duration): 50-500 ns; and lifetime: $10^7$-$10^8$ pulses. These parameters were chosen because these are the requirements specified for potential directed energy systems.

Figure 3A:
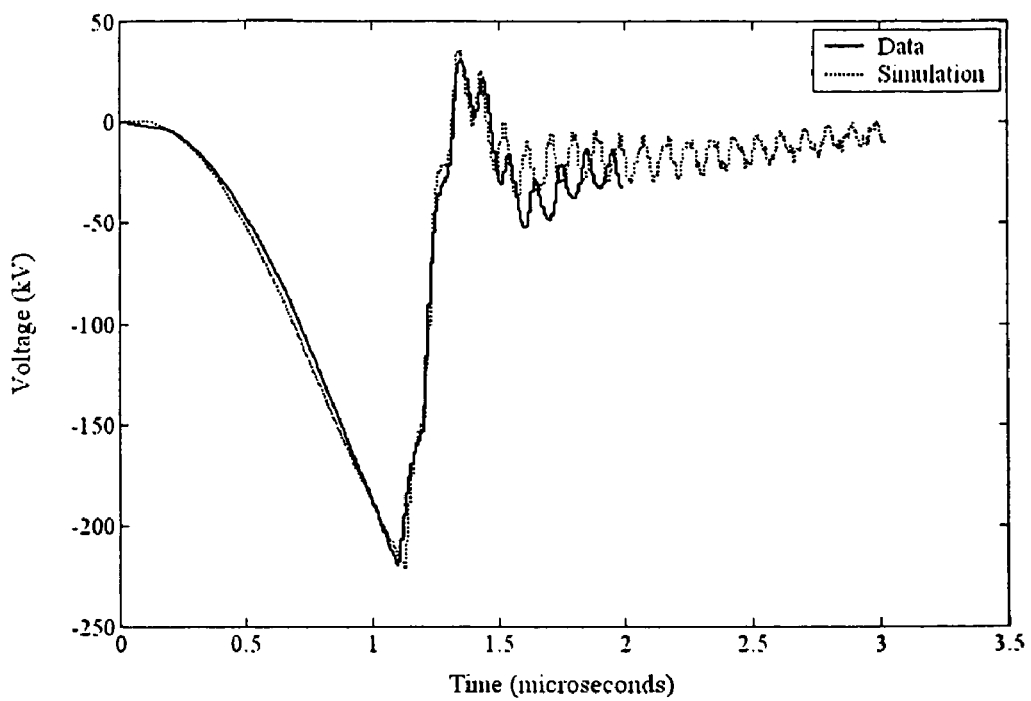
FIGS. 3A and 3B are graphs depicting experimental results showing the variation of switching voltage and carbon byproduct region size with time according to Example 1 of the present invention.

The switch incorporated adjustable electrodes, allowing the electrode separation to be adjusted from 0.1 to 1 cm. Optical viewports were also integrated with the design allowing both the framing and high speed camera diagnostics to be integrated into the test stand, for characterization of bubble formation and byproduct expansion velocity. The single shot switch of the present example typically switched a 100 ns, 270-325 kV, 100 kA pulse into a 1.6 Ω load, with an energy per pulse delivered to the load of approximately 1 kJ. A graph of switching voltage vs. time for one experiment is shown in FIG. 3A. Both transformer oil and synthetic lubricants, such as PAO, were used in the experiments. For a 0.2 cm electrode gap the calculated arc inductance of the switch was 3 nH (15 nH/cm×0.2 cm). For a 1.6 Ω discharge load the 10-90% inductive rise time of the switch was 3.8 ns, while the calculated 10-90% risetime of the switch was 10-11 ns, which is an order of magnitude less than the risetime for the rest of the circuit (thus the switch was not the limiting factor). The electrodes comprised a copper tungsten composite (K3); however, any conductive material may be used. The electrodes had a diameter of 3.81 cm (1.5 inches), although other sizes and/or shapes may be used.

Figure 3B:
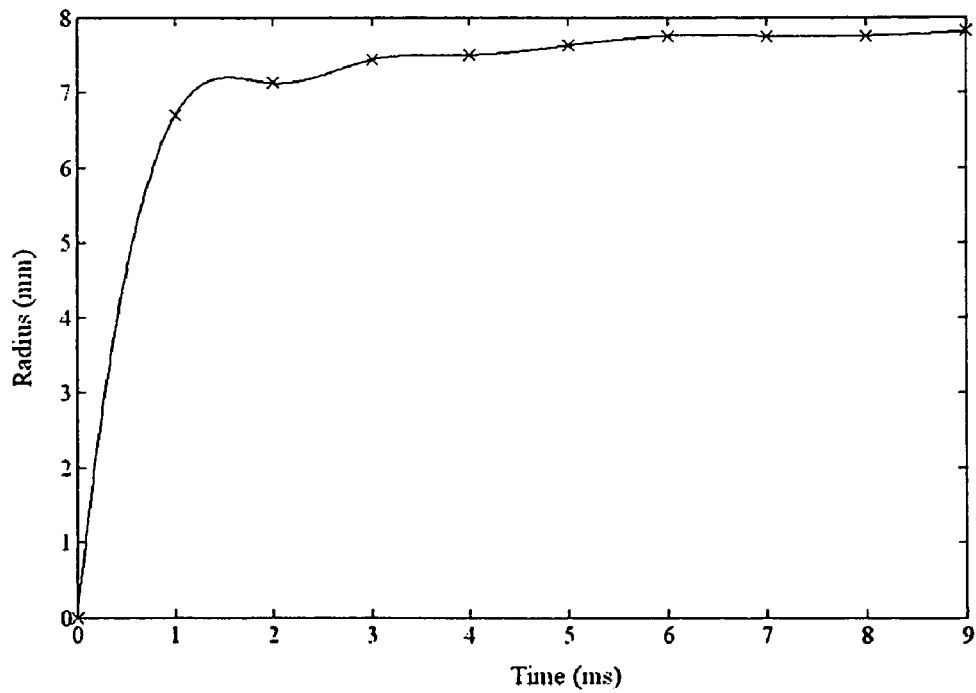

High speed optical diagnostics were used to observe the formation of bubbles and other byproducts. FIG. 3B graphs the radius of the region containing carbon byproducts vs. time after pulse at 2000 psig, showing that this region expands rapidly for about the first two milliseconds, with a modest expansion velocity of about 12.5 cm/s after that. This indicates that a 300 kV switch for use at or near this pressure, which can switch kilojoules of energy per pulse with a repetition rate of 100 pps, requires only a modest flow rate of 1-2 l/sec, which is almost a factor of 10 reduction from the atmospheric pressure switches known in the prior art. Concurrently the rise time of such a switch pulse charged in 1-1.2 microseconds will have a rise time of 10-11 nanoseconds or less, and allow kilojoules per pulse to be transferred at 100-200 pps. In addition, high speed photography showed that the bubbles and byproducts were swept out of the inter-electrode region in a short enough time to enable a repetition rate of at least hundreds of pulses per second. Thus the technology is scaleable to the goal of 1 MV and 100 pps operation, since only a modest 3-7 l/sec flow-rate will be required for such a switch.

Figure 4A:
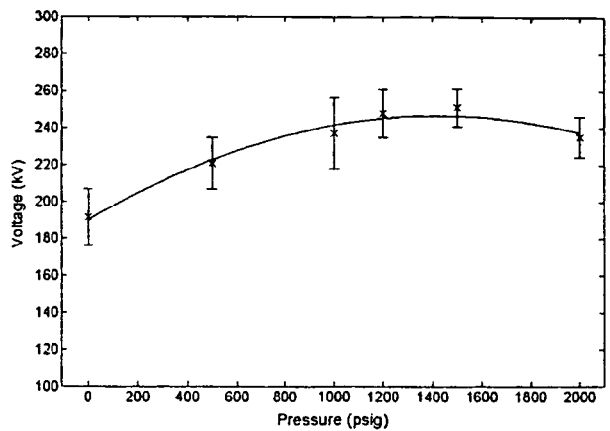
FIGS. 4A-4C are graphs depicting experimental results showing the variation of breakdown voltage, maximum bubble radius, and bubble oscillation period with pressure according to Example 1 of the present invention.
Figure 4B:
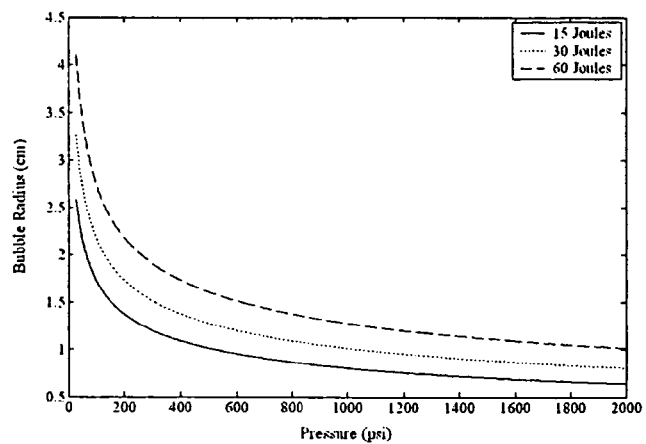
Figure 4C:
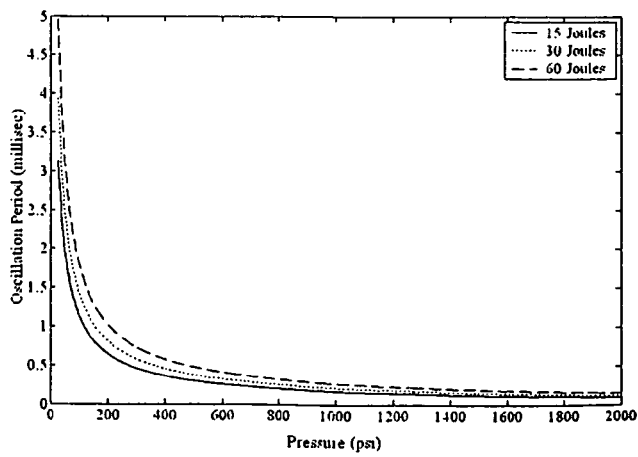

Experiments were conducted from atmospheric pressure up to 13.8 MPa (2000 psig). The voltage breakdown of the switch versus pressure, for a 0.2 cm electrode gap, is shown in FIG. 4A. The data correspond to a breakdown electric field varying between 1.1-1.25 MV/cm. Each data point represents the statistical average of ten breakdowns using unconditioned electrodes. The variation, about ±10%, decreased to about ±6.5% after conditioning of the electrodes. The error bars represent one standard deviation for each data set at the test pressure. The curve fit shown is a second order polynomial least squares approximation. The data shown in FIG. 4A indicate that the breakdown strength increases by 25-30% from atmospheric pressure to 10.3 MPa (1500 psig). Thus the use of high pressures increases the switching voltage, in agreement with earlier experiments. In addition, there is indicated an optimal pressure for which maximum voltage breakdown occurs. The maximum bubble radius and bubble oscillation period vs. pressure are shown in FIGS. 4B and 4C, clearly demonstrating the advantage of operating the switch at high pressures.

EXAMPLE 2

An improved high power, high pressure flowing oil switch for gigawatt, repetitive applications was constructed and tested. The switch is of the present invention is typically operated at test pressures to 17.24 MPa (2500 psi), flow rates to 0.72 L·s$^{-1}$ (11.4 gpm), charge voltages to −300 kV and discharge energies to 275 J per pulse at 20 pps. An examination of the electrodes after 250,000 shots with the original design led to the design of an insert device which resulted in higher performance fluid flow within the switch. The flow shaper-enhanced switch was tested for 150,000 shots.

Figure 5:
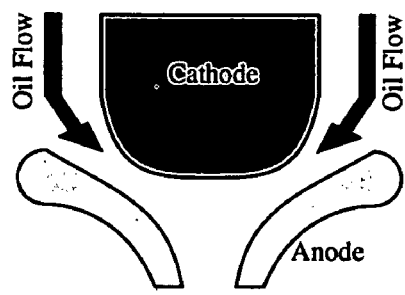
FIG. 5 is a cutaway diagram of a preferred embodiment of the switch geometry.

Typical operating parameters are presented in Table 1. A cross section of the switch geometry is shown in FIG. 5. As illustrated in the drawing, oil flows around the cathode electrode and into a contoured anode throat section. The switch gap spacing is a function of the operating pressure and preferably increases with pressure. Gap spacing is preferably set to 1.02 mm, with an estimated error of less than ±15 µm, while the switch is under atmospheric pressure.

TABLE 1

| TEST STAND PARAMETERS | |
|---|---|
| Charge Voltage | −300 kV |
| Pulse Current | 28.75 kA |
| PFL Impedance | 4.8 Ω |
| Pulse Risetime | 16 ns |
| Pulse Length | 70 ns |
| Repetition Rate | 20 pps |

Test Stand

Pulse Generator

Figure 6:
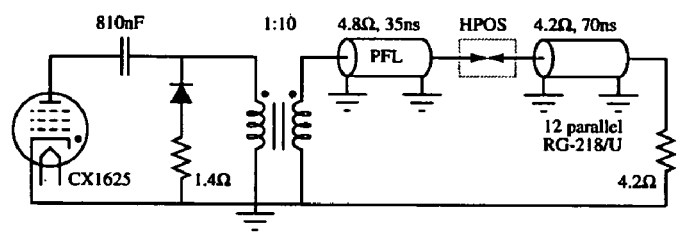
FIG. 6 is a basic circuit diagram showing pulse modulator to the left of the transformer and the water PFL to the right of the transformer.

The pulse generator used for testing the high pressure switch concept under repetitive pulse conditions is a 4.8 Ω, 70 ns water pulse forming line (PFL). The water PFL was pulse charged to a maximum of −300 kV in 2.5 µs through a pulse transformer. A capacitor-based pulse modulator was used to pulse charge the PFL. The modulator consisted of a hydrogen thyratron, a capacitor bank, and a snubber network as shown in FIG. 6, although other circuit configurations may be used. The capacitor bank was charged up to 26 kV, storing 273 J. Twelve 50 Ω cables 15.25 m in length were used to provide 70 ns of time-isolation between the PFL and the load resistor.

Figure 7:
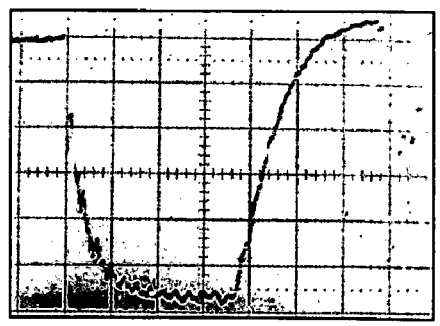
FIG. 7 depicts a typical discharge waveform recorded at the anode (11.4 kV/div vertical resolution, 20 ns/div horizontal resolution)

The charge and discharge voltages were monitored with a pair of D-dot probes. The probes were installed in the outer wall of the cylindrical metal structure that surrounds the switch. A liquid tight fit was made via Swagelok fittings and the output was fed into a passive integrator. A typical output voltage waveform is presented in FIG. 7 which shows a 10-90 rise time of about 16 ns.

Hydraulic Power Supply

Hydraulic power was provided by a portable hydraulic pumping unit. The pump utilized generated flow rates up to 0.72 L·s$^{-1}$ at pressures in excess of 17.24 MPa. The pump had an adjustable stroke compensation which was used to adjust volumetric flow at various pressures. The oil used for test purposes was an electrically insulating, thermally conductive, synthetic olefin-based liquid (PAO).

Fluid diagnostics used on the test stand included a pair of analog pressure gages and various flow rate sensors. Pressure in and across the switch was monitored with a pair of ENFM bourdon-tube pressure gages that had pressure resolution to 10 psig. Both the inlet pressure and the outlet pressure were recorded, however only the inlet pressure is reported herein. Overall volumetric flow rate was monitored in the oil return line with a viscosity compensated turbine sensor manufactured by Cox Instruments. A pair of Hedland variable area flow sensors monitored relative flow rates in the two oil lines that fed the high pressure switch.

High performance filters were installed to increase the cleanliness of the oil both entering and leaving the switch. The filter elements are rated to retain more than 99.9% of particles 0.45 µm or larger that are suspended in the oil passed through the media.

Test Results

The high pressure switch was tested under both single shot and repetitive conditions over a range of pressures, flow rates and temperatures. The single shot work examined the statistical nature of breakdown voltage, electric field strength, and jitter under typical test conditions.

Figure 8:
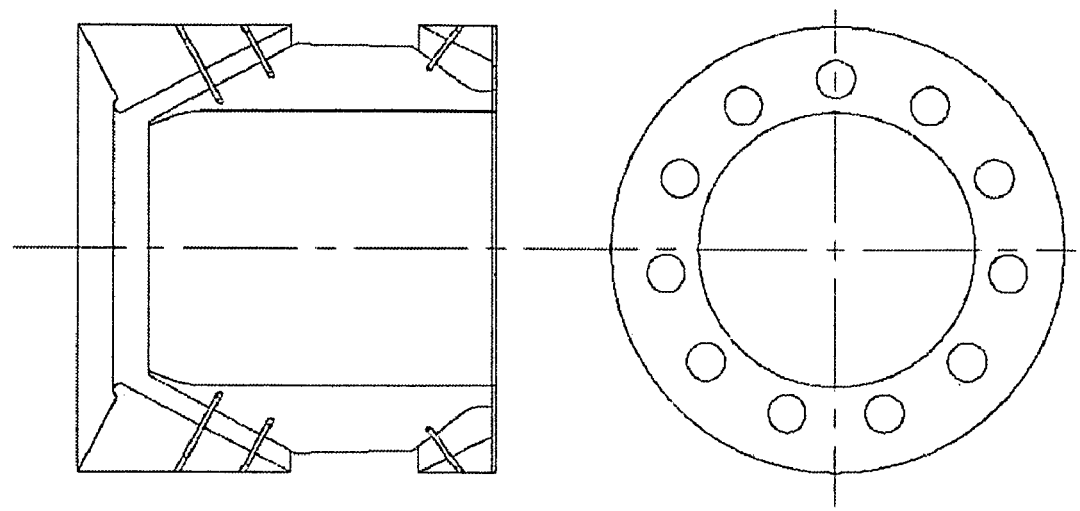
FIG. 8 shows cross sectional and end views of a flow shaping element of an embodiment of the present invention.
Figure 9:
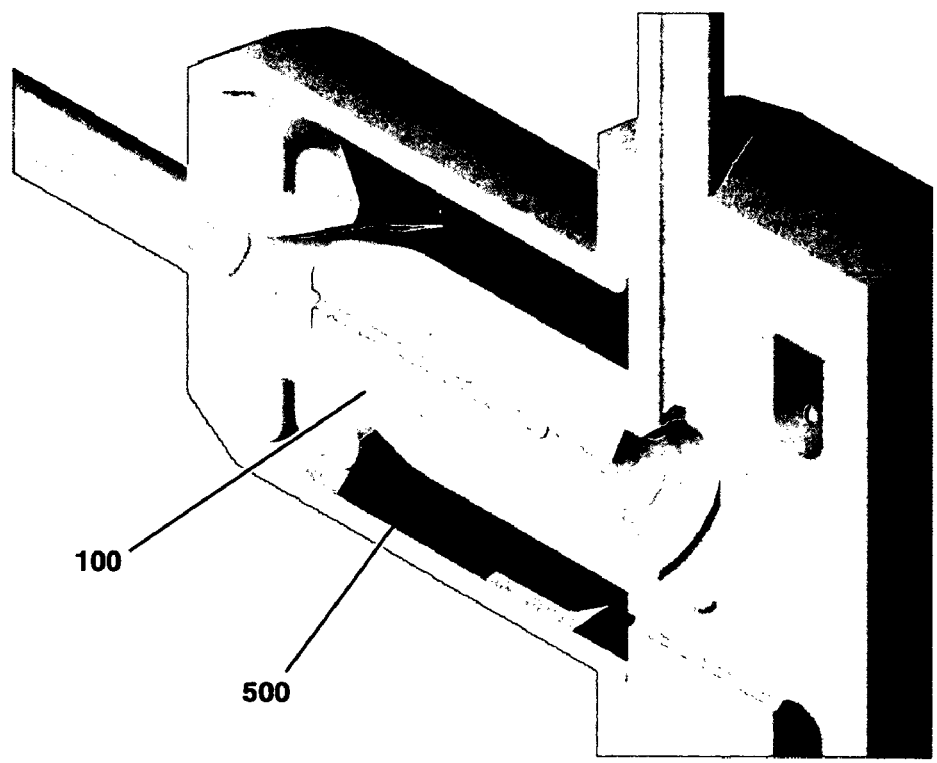
FIG. 9 shows the flow shaping element of FIG. 8 installed in the switch.

The high pressure switch geometry is a pin in hole type geometry as indicated in FIG. 5. In the original geometry oil is forced to flow around the cathode and down through the center of the anode. In the present test a flow shaping element was introduced that reduced the cross sectional area of the oil path, thereby reducing turbulence and effectively eliminating eddy flows near the stressed region of the switch. FIG. 8 shows a cross section and an end view of the flow shaping element or flow straightener. As shown in FIG. 9, flow shaping element 500 is preferably disposed approximately cylindrically around input electrode 100. The flow straightener preferably forces the flow to equalize across the switch volume, preventing circulation of the fluid azimuthally and radially. By shaping the flow cross section, the flow shaper also controls the velocity of the liquid dielectric in the switch. The addition of two flow sections in the switch produces a venturi or jet pump on-axis pumping action to break up boundary layers or stagnation layers that are inherent to flowing geometries. Flow through the on-axis nozzle or orifice can be controlled separately or independently from the flow through the shell of the switch. Use of this flow element enables high repetition rates for the switch.

The gap spacing was generally set at 1.016 mm and the electrodes had a pressure dependent field enhancement factor of about 11.7 at 13.79 MPa and 11.0 at 17.24 MPa. The peak field stress expected at 250 kV and 13.79 MPa was approximately 2.3 $MV \cdot cm^{-1}$. Pressure drop across the switch varied, depending on the flow rate, from 69 kPa (10 psi) at the lowest flow rates to 207 kPa (30 psi) at the highest flow rates.

Single Shot Tests

An analysis of the single shot switch performance was undertaken to define a hold-off strength for oil under test conditions. Tests were performed at six pressures and two volumetric flow rates. At each combination of pressure and flow a sample of 50 shots was recorded, each shot separated in time by greater than 45 seconds. The tests were performed using 304 stainless steel electrodes following 140,000 shots of electrode break in and conditioning. The D-dot probe adjacent to the charge electrode was used to record the waveforms. Post-processing was performed to reconstruct the actual charge waveform and generate an electric field strength value.

Figure 10:
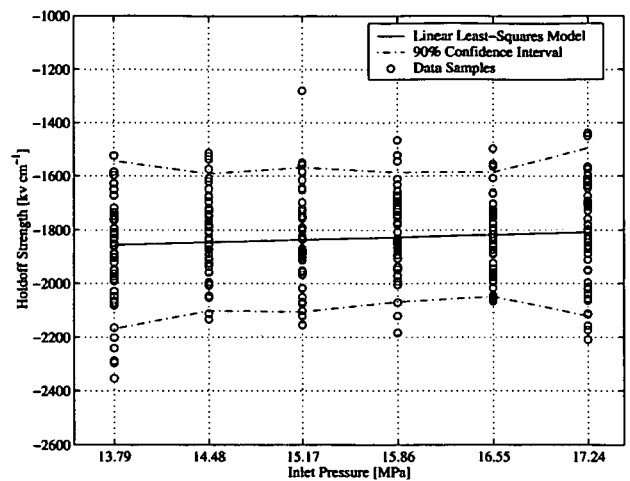
FIG. 10 shows electric field strength at breakdown versus switch inlet pressure for a net volumetric flow rate of 0.379 $L \cdot s^{-1}$ (6 gpm)
Figure 11:
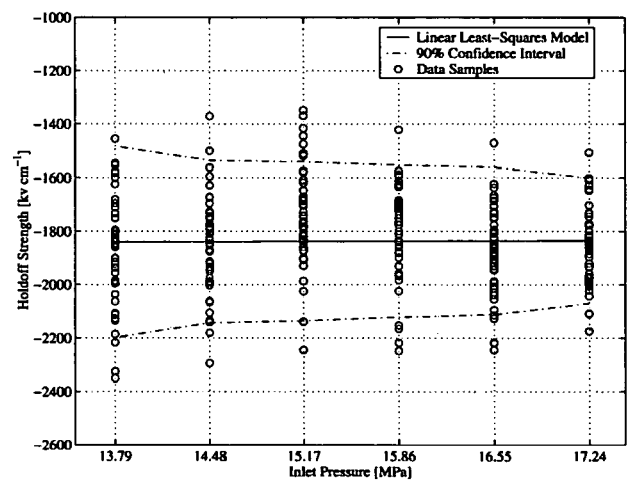
FIG. 11 shows electric field strength as a function of switch inlet pressure for a net volumetric flow rate of 0.568 $L \cdot s^{-1}$ (9 gpm)

Plots of the electric field strength at breakdown as a function of pressure for two volumetric flow rates are shown in FIGS. 10 and 11. The graphs show a solid line representing the linear least-squares fit to the data. The dashed line represents the boundaries of a 90% confidence interval of the data at each pressure. The small slope of the solid lines combined with the relative width of the confidence intervals suggest that the electric field strength at breakdown is not strongly affected by pressure over the range of pressures reported.

Breakdown jitter was noted earlier to be an important performance parameter for the high pressure switch of the present invention. The data plotted in FIG. 10 shows no strong correlation between jitter over the range of pressures reported. The 1 σ jitter for the data reported is ±9.7% at 13.79 MPa and ±10.0% at 17.24 MPa. Examination of the 90% confidence interval data in FIG. 11 does show some correlation between breakdown jitter and pressure, with jitter decreasing as a function of pressure. The 1 σ jitter is ±11.4% at 13.79 MPa and ±8.1% at 17.24 MPa. These results indicate a reduction of around ±3.3% over the range of pressures examined.

Repetition Rate Tests

Figure 12:
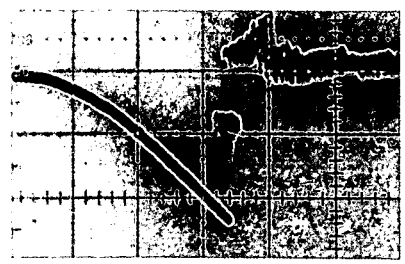
FIG. 12 shows five shot bursts at 1 pps (71.4 kV/div vertical resolution, 500 ns/div horizontal resolution)

The switch was tested under repetitive conditions for several hundred thousand shots. The repetition rate tests were conducted to establish the relationship between oil pressure, volumetric flow rate, breakdown hold-off jitter and recovery, and electrode wear. Waveforms were photographed to obtain information about total jitter and mean breakdown electric field strength under various rep rates. FIG. 12 shows the results of operation at 1 pps and at constant pressure, constant flow rate and constant oil temperature. The time jitter in the figure, measured from the leading edge of the pulse train to the trailing edge of the pulse train, is approximately 125 ns or 5% of the time to peak. Qualitative analysis of the repetition rate data over 1000 shot bursts indicate that jitter is within the same order of magnitude as the single shot jitter. The switch has been tested at up to 22 pps and the results are nearly identical to single shot and 1 pps results.

Electrode lifetime tests were conducted under rep rate conditions. Oil pressure was generally kept around 13.79 MPa (2000 psig), flow rates varied from 0.379 $L \cdot s^{-1}$ to 0.681 $L \cdot s^{-1}$ and temperatures were kept between 18° C. and 32° C. Tests were performed at repetition rates between 1 pps and 20 pps, with the majority of the tests taking place at 15 pps and in 1000 shot bursts.

Repetition rate testing was performed with two distinctly different fluid path designs. The original switch concept had a geometry that resembled that shown in FIG. 5. In the interest of improved switching performance a second design was implemented to modify the oil path. The design was meant to reduce random swirling that was predicted by a computational fluid dynamics simulation of the original geometry. The flow shaper design featured a constrained oil path with less cross sectional area to increase the average oil velocity and vanes in the fluid path to establish a swirl-free velocity profile within the electrically stressed regions of the switch.

Figure 13:
FIG. 13 shows a type 304 stainless steel electrode following 250,000 shots with original oil flow configuration. The width of the arc band is approximately 1.7 cm.

The original switch design was run with 304 stainless steel electrodes. More than 250,000 shots were taken in the course of this first test series. When the switch was removed from the test stand the discharge pattern was recorded. The discharge is supposed to occur within a band on the side of the pin electrode. The arc sites were uniformly distributed over a band that was approximately 1.7 cm wide. A photograph of the discharge band is shown in FIG. 13.

Figure 14:
FIG. 14 shows an Elektro-Metall (formerly Schwarzkopf) K-33 electrode following 4000 shots with enhanced oil flow configuration. The width of the main spot (top to bottom) is approximately 0.7 cm.

A set of K-33 sintered copper-tungsten electrodes was fabricated and installed in the hopes of increased performance over the stainless steel electrodes. In addition to the electrode material change the flow shaper was installed. After less than 4000 shots under rep rate conditions rapid increases in system pressure were observed during operation. The switch was removed and the electrodes were inspected. The wear pattern was noted to be very localized, showing signs consistent with spallation. The pressure variations observed during operation were apparently a result of pieces of the electrode getting caught in a down-stream needle valve. A photograph of the damage is shown in FIG. 14.

Figure 15:
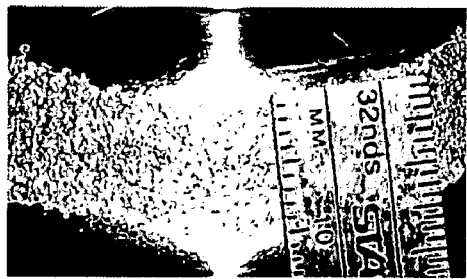
FIG. 15 shows a second type 304 stainless steel electrode after 150,000 shots with enhanced oil flow configuration. The width of the arc band is approximately 1.0 cm.

A second set of 304 stainless steel electrodes were installed with the flow shaper and lifetime tests were restarted. After approximately 140,000 shots the single shot tests already reported were performed. Following the single shot tests the electrodes were removed. The wear pattern that had developed was more distinct and defined than that seen on the first 304 stainless steel electrodes. The width of the discharge band had decreased by 41% to about 1.0 cm. A photograph of the wear pattern is shown in FIG. 15. These tests indicate that the electrode lifetime may be greater than $10^7$ shots.

Throughout all of the tests described herein the dielectric oil was not flushed and replenished. Water content was expected to be around 200 to 300 ppm since the oil reservoir is open to the atmosphere and tests were performed in a region notorious for high humidity. Analysis unexpectedly revealed that water content was around 13 ppm. Thus during operation, the switch of the present invention removes water from the oil or hydrocarbon fluid used due to the high energy plasma arc which is produced. The present invention can therefore be used to remove water from the hydraulic fluid, PAO, or flowing dielectric with out chemically changing the oil. Further, this method can be used to remove water from such fluids, or related fluids, even when the use of a high power switch is not required. One example of such use is in an aircraft, where the fluid comprises hydraulic fluid. If water exists in any appreciable concentration in the fluid, corrosion of the hydraulic components can occur. The present invention can prevent that from happening.

As noted in Leckbee et al's 2004 paper, significant quantities of carbon are generated during discharge under high pressure. Following the first 250,000 shots the oil return line filter was examined and found to be jet black from all of the carbon deposits. Based on this examination the filter was changed between the first 304 stainless steel electrode tests and the K-33 electrode tests.

The preceding examples can be repeated with similar success by substituting the generically or specifically described operating conditions of this invention for those used in the preceding components.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An electric switch comprising:
   at least two electrodes;
   a flowing liquid dielectric having a pressure greater than approximately 100 psig; and
   a trigger for operating said switch.

2. The switch of claim 1 wherein said trigger comprises an element selected from the group consisting of a trigatron, a laser pulse, a microwave pulse, and series injection.

3. The switch of claim 2 wherein said trigatron is disposed substantially between said electrodes.

4. The switch of claim 1 wherein said trigger is operated by adjusting a pressure of said dielectric.

5. The switch of claim 1 further comprising at least one additive in said dielectric, said additive for reducing a dielectric strength of said dielectric.

6. The switch of claim 1 further comprising an element for controlling a flow of said dielectric.

7. The switch of claim 6 wherein said element is cylindrically disposed around one of said at least two electrodes.

8. The switch of claim 1 capable of switching greater than approximately 1 joule.

9. A method for switching comprising the steps of:
   providing at least two electrodes;
   pressurizing a liquid dielectric to a pressure greater than about 100 psig;
   flowing the liquid dielectric between the electrodes; and
   triggering a dielectric breakdown between the electrodes, thereby providing an electrical path between the electrodes.

10. The method of claim 9 further comprising the step of switching greater than approximately 1 joule.

11. The method of claim 9 wherein the triggering step is performed at a desired voltage or desired time.

12. The method of claim 9 wherein the triggering step comprises operating a trigatron.

13. The method of claim 9 wherein the triggering step comprises:
   raising a pressure of the dielectric, thereby increasing a gap between the electrodes to a first gap value;
   providing a voltage difference between the electrodes; and
   lowering the pressure of the switch, thereby decreasing the gap between the electrodes to a second gap value.

14. The method of claim 13 wherein the voltage difference is not large enough to cause dielectric breakdown at the first gap value but is large enough to cause dielectric breakdown at the second gap value.

15. The method of claim 9 further comprising the step of controlling a flow of the dielectric.

16. The method of claim 15 wherein the controlling step comprises employing a flow shaping element.

17. A method for reducing water content in a dielectric, the method comprising the steps of:
   providing at least two electrodes;
   pressurizing a liquid dielectric containing water to a pressure greater than about 100 psig;
   flowing the liquid dielectric between the electrodes; and
   triggering a dielectric breakdown between the electrodes, thereby removing at least some of the water from the dielectric.

18. The method of claim 17 wherein the dielectric comprises a fluid selected from the group consisting of a synthetic lubricant, hydraulic fluid, and polyalphaolefin (PAO).

19. An electric switch comprising:
   at least two electrodes;
   a flowing liquid dielectric having a pressure greater than approximately 100 psig; and
   a flow shaping element for controlling a flow of said liquid dielectric.

20. An electric switch comprising:
   at least two electrodes;
   a flowing liquid dielectric having a pressure greater than approximately 100 psig; and
   a dielectric additive for reducing a dielectric strength of said dielectric.

* * * * *